United States Patent

[11] 3,586,767

[72] Inventor Charles A. Merchand
New York, N.Y.

[21] Appl. No. 718,668
[22] Filed Apr. 4, 1968
[45] Patented June 22, 1971
[73] Assignee Data-Plex Systems, Inc.
New York, N.Y.

[54] RECONSTRUCTABLE TELEVISION TRANSMISSION SYSTEM
6 Claims, 1 Drawing Fig.

[52] U.S. Cl. 178/5.6, 178/6, 178/Dig. 23, 178/6.6 DD
[51] Int. Cl. H04n 7/08
[50] Field of Search 178/5.6, 5.8, 6TM, 5.4C, 5.4

[56] References Cited

UNITED STATES PATENTS

| | | | |
|---|---|---|---|
| 2,217,157 | 10/1940 | Cooley | 178/5.6 |
| 2,918,524 | 12/1959 | Hume | 178/5.6 |
| 3,493,674 | 2/1970 | Houghton | 178/6.8 |

OTHER REFERENCES

NASA TECH. BRIEF, " Multiplex Television Transmission System," Dec. 1967, Brief 67-10576

*Primary Examiner*—Robert L. Griffin
*Assistant Examiner*—Joseph A. Orsino, Jr.

ABSTRACT: A television system includes a central television transmitter, a relay station, a plurality of general information receivers and a plurality of special receivers. The central transmitter transmits at least fields of general user information interplexed with fields of special user information to the relay station. The relay station selects the fields of special user information for transmission to the special receivers and also substitutes for such fields adjacent fields of general user information so that a continuous stream of general user information can also be transmitted to the plurality of general information receivers.

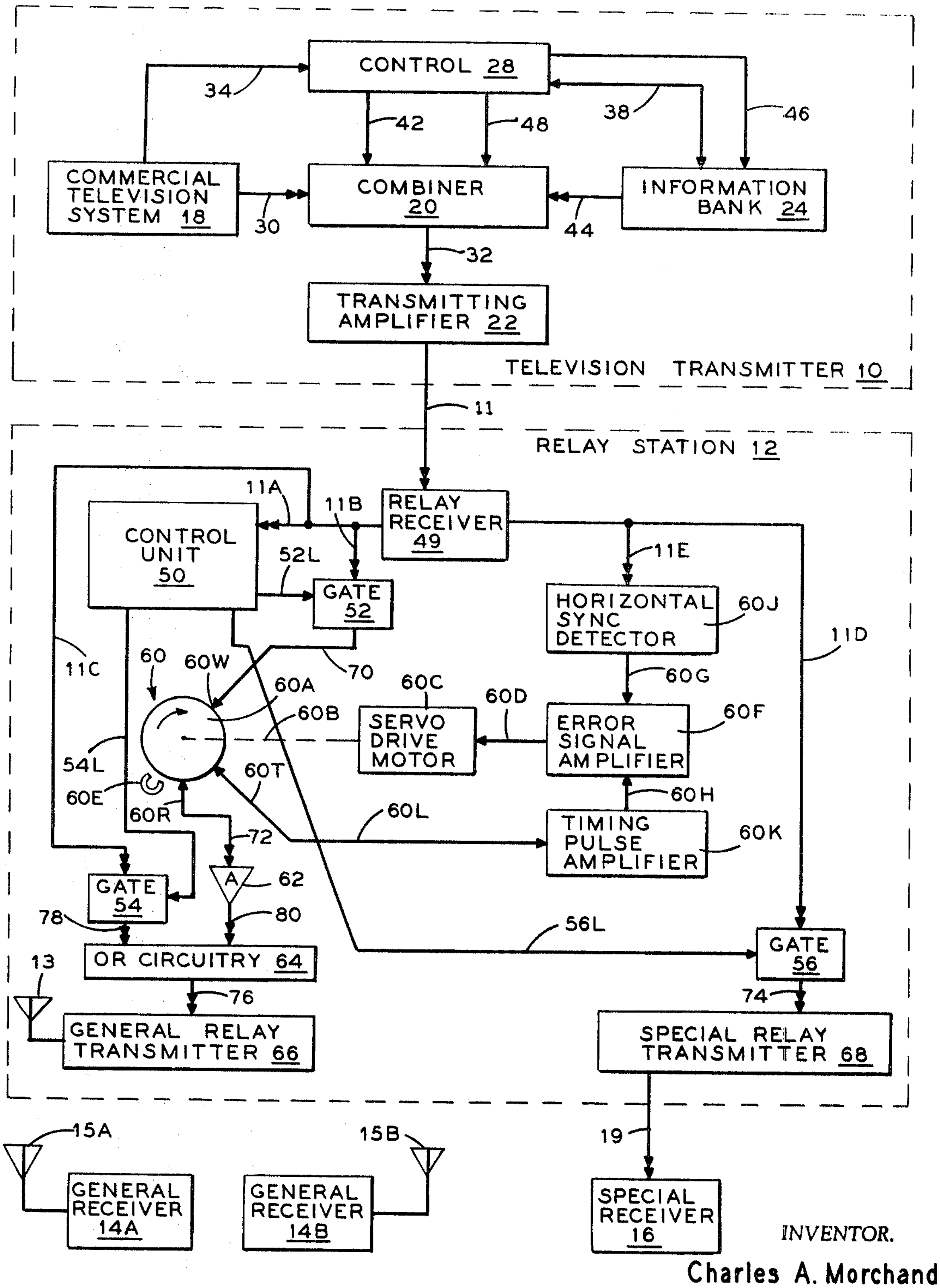
*INVENTOR.*
Charles A. Morchand

RECONSTRUCTABLE TELEVISION TRANSMISSION SYSTEM

This invention pertains to television systems and more particularly to television systems which transmit two classes of information interleaved over the same channel.

The most common class of user information is general viewer information such as commercial television programming which is broadcast over a wide area such as a city. In order to get long haul transmission of such information the television networks generally lease microwave or coaxial links from common carriers such as the American Telephone and Telegraph Co. Such long haul transmission is extremely expensive and at present can only be justified for mass audiences or for national defense.

There is another class of users who require an output terminal for intermittent information. At present these users rely on teletypewriters, teleprinters and facsimile devices. In addition to these users, there are others in this class who are awaiting faster, more versatile and economic display systems. In any event, this second class of users are in the following categories: communication services requiring visual displays; information services handling slide shows, stock market reports, news reports, etc.; bibliographic services requiring information retrieval from central libraries; computer graphics services; computer aided education; and multiaccess computing. In some cases the users require visual information while in others it can be pulse-coded information requiring further processing.

This second class of users generally cannot afford the cost of long haul and specialized transmission.

In my copending application for Television System for Two Classes of Information, Ser. No. 718,298, now abandoned filed Mar. 15, 1968, I disclosed a system which permits these special users to partake in long haul and specialized transmission inexpensively. While the disclosed system satisfied such a need, it created a demand for even better systems.

It is accordingly a principal object of the invention to provide such a better system.

Briefly, the invention contemplates a system including a television transmitter, a television relay unit and at least one receiver. The television transmitter comprises means for generating at least fields of a first class of information and also means for generating at least fields of a second class of information. The fields are sequentially transmitted with at least one field of the second class of information inserted between two fields of the first class of information. There is also transmitted an indicator signal related to the time of occurrence of the field of the second class of information.

The relay unit includes means for receiving the sequentially transmitted fields of information as well as control means which receive the indicator signals for generating control signals. A retransmitting means in the relay unit controllably retransmits some of the received fields of information by utilizing a reconstructing means responsive to the control signals. The reconstructing means substitutes for the field of the second class of information one of the adjacent fields of the first class of information so that the retransmitting means only retransmits fields of the first class of information to the receiver.

The invention further contemplates another retransmitting means in the relay unit which is also responsive to the control signals for transmitting to other receivers only fields of the second class of information.

It should be noted that the density of fields of the second class of information interplexed or inserted between frames of the first class of information can range from, say, one out of hundred or more to the case where the fields alternate between the first and second classes of information.

It should also be noted that the fields need not contain conventional television amplitude-modulated video signals but can be considered as time slots having start-of-field signals which contain digitally coded information signals.

By utilizing such a system special program information becomes more accessible and, therefore, dissemination of information is enhanced. In addition, the burden of transmission cost is spread over a wide enough portion of the population that many of the specific services listed above become economically feasible.

Other objects, the features and advantages of the invention will be apparent from the following detailed description of the invention when read with the accompanying drawing whose sole figure shows in block diagram form apparatus for practicing the invention.

As is well known, conventional television systems transmit viewer information to television receivers in the form of frames wherein each frame comprises two fields. Each field includes one half of the horizontal raster lines and the horizontal raster lines of adjacent pairs of fields are interlaced to obtain the full raster. One field includes the odd raster lines and the other field includes the even raster lines. In conventional television transmission systems there are 30 frames (or 60 fields) a second.

Generally, the system as disclosed, by way of example, will substitute for one of the fields of a frame of a conventional commercial television program (general viewer information) a field of information (specific viewer information) intended for specific viewers. The specific viewers could be, for example, students in a nationwide educational program, researchers subscribing to a centralized information retrieval network, etc. The specific viewers could even be viewing a different commercial television program. At a relaying unit the different type fields will be separated out for transmission to their own viewers.

The system as shown comprises a television transmitter 10 which transmits information via transmission link 11, relay unit 12 and antennas 13, 15A and 15B and line 19, to television receivers 14 and 16. Two types of receivers are shown. Receivers 14 are for viewers who are watching general publicly available commercial program information, and receiver 16 is for a special viewer. As a practical matter, general receivers of the type of receivers 14 will predominate over the other type. In fact, because of transmission to the receivers of this type, special transmission to receivers of the types of special receiver 16 becomes economically feasible.

Television transmitter 10 which will now be described in greater detail comprises commercial television generating system 18, combiner 20, modulating and transmitting amplifier 22, control 28 and information bank 24.

Commercial television generating system 18 is basically a regular television station which generates commercial television programs, i.e., generates the audio and video signals, the required horizontal and vertical sync pulses, the blanking pulses and the equalizing pulses. The combiner 20 can be an electronic switch which controllably accepts signals from selected ones of a plurality of inputs and transmits the accepted signals to an output. Transmitting amplifier 22 can be the carrier modulation and amplifying portion of a conventional television transmitter which drives the transmission link 11 which can be microwave or coaxial link or satellite.

The information bank 24 is the source of specific viewer information. It can be magnetic tape or disc units carrying frames or fields of encoded video information representing, for example, slides or alphanumeric display. In more sophisticated systems information bank 24 can be microfilm libraries, holographic or other optical or photographic storage libraries. In formation bank 24 can include a buffer or temporary storage device such as a magnetic tape or disc system, or even a magnetic core or film storage system for temporarily storing the frames or fields of selected specific viewer information.

Control 28 is a programming unit which can receive signals to initiate control sequences and generate control signals. The function and contents of control 28 will become more apparent during the description of the operation of television transmitter 10.

It should be noted that double arrow-headed lines carry information signals while single arrow-headed lines carry control signals.

In operation, commercial program information is transmitted from system 18 via line 30 to one input of combiner 20. The commercial program information passes through combiner 20 and via line 32 and amplifier 22 to transmission link 11. At the same time, start-of-field pulses (these can be either the vertical sync pulses or the vertical blanking pulses or any similar signals) of the commercial program information are fed via line 34 to control 28. Control 28 selects periodically and/or in response to a programming device a field of special program information from information bank 24 by transmitting a selection signal on line 38 thereto. When information bank 24 is ready to transmit the selected field it transmits a signal back to control 28 via line 38. The next start-of-field pulse causes control 28 to transmit to combiner 20 an indicator signal on line 48 for inclusion in, say, the vertical blanking signal of the field or a characteristic tone in the audio portion of the signal now being transmitted from system 18. It is also possible to include a characteristic signal in the last line of the previous field or in the first line of the present field since these lines are usually not displayed in regular television receivers. The second next start-of-field pulse that occurs causes control 28 to emit a control signal via line 42 to combiner 20 which causes it to stop accepting signals on line 30 from system 18 and to start accepting signals on line 44 from information bank 24; and thereafter to emit a control signal on line 46 to information bank 24 for starting the readout of the contents thereof via line 44 to combiner 20. Thus the field of special program information is substituted for one field of the general program information. The third next start-of-field pulse received by control 28 restores the control 28 to its initial condition. In particular, the control signals on lines 42 and 46 disappear and combiner 20 again accepts signals from line 30. In summary, the information in transmission link 11 comprises a first plurality of fields of general viewer information with the last occurring field of this plurality having an indicator signal in its vertical blanking signal, a field of special viewer information, and a second plurality of general viewer information. All the information in transmission link 11 is received by relay station 12.

Relay station 12 comprises: a relay receiver 49 connected to link 11; a control unit 50 which, in response to the indicator signals received on line 11A from the output of receiver 49 controls operation of gates 52, 54 and 56 through the agency of signals on lines 52L, 54L and 56L respectively; the inputs of gates 52, 54 and 56 are connected via lines 11B, 11C and 11D respectively to the output receiver 49; a delay unit 60, hereinafter more fully described, delays, by one field time, signals received at its input connected, via line 70, to the output of gate 52 and transmits the delayed signals, via line 72, to the input of amplifier 62; a special relay transmitter 68 which transmits signals via line 19, to special receiver 16, the input of transmitter 68 is via line 74, to the output of gate 56; and a general relay transmitter 66 which transmits signals received, via line 76, from the output of OR circuit 64, whose inputs are connected, via lines 78 and 80, to the outputs of gate 54 and amplifier 62, respectively.

The operation of relay station 12 will now be described. Normally, i.e., when no indicator signals are being received, gate 54 is open while gates 52 and 56 are closed. The fields of information pass from receiver 49, via line 11C, gate 54, line 78, OR circuit 64 and line 76, to general relay transmitter 66 for transmission thereby via antennas 13 and 15 to general receivers 14. Now when an indicator signal is received it passes via line 11A, as do all the signals received by receiver 49, to control unit 50. Control unit 50 contains circuitry for detecting this indicator signal and sets a first flip-flop which emits a signal on line 52L which opens gate 52. Therefore, the field associated with the indicator signal is not only transmitted via line 11C to transmitter 66 but also passes, via line 11B, gate 52 and line 70 to the input of delay unit 60. When the next start-of-field pulse (the vertical blanking pulse) is received, a suitable detector in control unit 50 detects it and cooperating with the signal from the first flip-flop therein sets another flip-flop which generates signals on lines 54L and 56L and terminates the signal on line 52L. Gates 52 and 54 close and gate 56 opens. The associate field does not enter general relay transmitter 66 but does pass, via line 11D, gate 56 and line 74 to special relay transmitter 68. At the same time, the preceding field leaves delay unit 60 and passes, via line 72, amplifier 62, line 80, OR circuit 64 and line 76 to general relay transmitter 66. Thus the field of special viewer information is transmitted by relay transmitter 68 and the prior field (general viewer information) is substituted for it at general relay transmitter 66.

The next start-of-field signal received by control unit 50 clears the second flip-flop therein terminating the signals on lines 54L and 56L. Gate 54 opens, gate 56 closes and normal operation proceeds until another indicator signal is received.

While delay unit 60 can take many forms, the disclosed example comprises a magnetic disc 60A comprising a recording head and amplifier 60W, a reading head and amplifier 60R located a field time downstream of head 60W, and an erase head 60E (a permanent magnet) located downstream of head 60R. If disc 60A rotates at a given speed heads 60W and 60R are circumferentially displaced along a track of the disc so that information entering head 60W leaves head 60R one field time later. To insure the desired constancy of rotation a servo system can be employed.

The servo system includes servo drive motor 60C which is coupled to shaft 60B of disc 60A. Servo motor 60C is driven by signals received via line 60D from error signal amplifier 60F. Amplifier 60F includes a phase comparator for comparing the relative phases of signals received on lines 60G and 60H and generating a speed control signal related to the comparison. The signals on line 60G can be the horizontal sync pulses of the fields as detected by detector 60J whose input is connected to the output of receiver 49 via line 11E. The signals on line 60H are from timing pulse amplifier 60K whose input is connected, via line 60L, to a reading head 60 T. Reading head 60T is opposite another track of disc 60A upon which are recorded timing pulses. The timing pulses are so recorded that when the disc is rotating at the desired speed, they occur in frequency and phase synchronism with the horizontal sync pulses.

There has thus been shown improved means for economical dissemination of specific viewer information.

There are many modifications for enhancing the system. For example, it is possible to transmit conventional frames in a piecemeal manner, i.e., a fraction of a frame per conventional field, and build up the frame in a frame store to a conventional frame or to a frame having at least double the conventional number of lines.

While the system has been discussed with respect to substituting fields it could equally well be used for substituting frames.

It is also possible to multiplex the special frames as shown in my U.S. Pat. Nos. 3,180,931, and 3,256,386 and my Patent Application Serial No. 527,437 now U.S. Pat. 3,345,758, to further increase the amount of information transferred. For example, with respect to my U.S. Pat. No. 3,180,931 it is possible to recenter the quadrants and expand the sweep on the frame store.

Furthermore, it should be realized that separate sequences of specific viewer frames can be essentially simultaneously transmitted wherein each sequence by virtue of preassigned characteristic tone signals or other coded signals will be received by different classes of viewers.

In addition, while the system has been described with respect to a commercial television system it can be used with closed circuit systems, coaxial systems, satellite systems or any industrial, educational or private systems. In such systems faster frame rates can be utilized.

While the information has been stated as being primarily visual information, it should be obvious that audio information can be similarly handled through subcarriers and the like.

Although only one transmitter has been shown, it is possible to employ a plurality of cooperating transmitters suitably synchronized to service the receivers at a higher output of information rate.

While only one embodiment of the invention has been shown and described in detail, there will now be obvious to those skilled in the art many modifications and variations satisfying many or all of the objects of the invention but not departing from the spirit thereof as defined by the appended claims.

What I claim is:

1. A television transmission system comprising: a television transmitter comprising means for generating at least fields of a first class of information, means for generating at least fields of a second class of information, means for sequentially transmitting all of said fields with at least one field of said second class of information being inserted between two fields of said first class of information, means for transmitting an indicator signal related to the time of occurrence of said field of said second class of information; a television relay unit comprising means for receiving the sequentially transmitted fields of information, control means receiving said indicator signal for generating control signals, first retransmitting means for controllably retransmitting some of the received fields of information, said first retransmitting means including reconstructing means responsive to said control signals for substituting for said field of said second class of information one of the fields of said first class of information adjacent thereto so that said first retransmitting means only retransmits fields of said first class of information without interruption, said reconstructing means comprising first and second gating means, each of said gating means having an input for the sequentially transmitted fields of information and an output, a delay means for delaying fields of information for at least one field time, said delay means having an input connected to the output of said first gating means and an output, means having inputs connected to the output of said second gating means and the output of said delay means and an output for transmitting fields of information received at either input thereof, and means responsive to said control signals for controlling the transmission states of said first and second gating means, and second retransmitting means for controllably retransmitting some of the received fields of information, said second retransmitting means including field selecting means responsive to said control signals for selecting said field of said second class of information so that said second retransmitting means only transmits fields of said second class of information; at least one receiver for receiving the fields transmitted by said second retransmitting means; and at least one further receiver for receiving the fields transmitted by said first retransmitting means.

2. The television system of claim 1 wherein said delay means is a magnetic disc recording reproducing system rotating in synchronism with the field rate.

3. The television system of claim 1 wherein said indicator signal occurs in the field preceding said field of said second class of information.

4. The television system of claim 3 wherein the field of said first class of information being substituted for said field of said second class of information is the field preceding said field of said second class of information.

5. A television transmission system comprising: a television transmitter comprising means for generating at least fields of a first class of information, means for generating at least fields of a second class of information, means for sequentially transmitting all of said fields with at least one field of said second class of information being inserted between two fields of said first class of information, a television relay unit comprising means for receiving the sequentially transmitted fields of information, control means for generating control signals, first retransmitting means for controllably retransmitting some of the received fields of information, said first retransmitting means including reconstructing means responsive to said control signals for substituting for said field of said second class of information one of the fields of said first class of information adjacent thereto so that said first retransmitting means only retransmits fields of said first class of information without interruption, said reconstructing means comprising first and second gating means, each of said gating means having an input for the sequentially transmitted fields of information and an output, a delay means for delaying fields of information for at least one field time, said delay means having an input connected to the output of said first gating means and an output, means having inputs connected to the output of said second gating means and the output of said delay means and an output for transmitting fields of information received at either input thereof, and means responsive to said control signals for controlling the transmission states of said first and second gating means, and second retransmitting means for controllably retransmitting some of the received fields of information, said second retransmitting means including field selecting means responsive to said control signals for selecting said field of said second class of information so that said second retransmitting means only transmits fields of said second class of information; at least one receiver for receiving the fields transmitted by said second retransmitting means; and at least one further receiver for receiving the fields transmitted by said first retransmitting means.

6. The television system of claim 5 wherein said delay means is a magnetic disc recording reproducing system rotating in synchronism with the field rate.